M. A. ROHMER.
NUT LOCK.
APPLICATION FILED SEPT. 25, 1915.

1,259,558.

Patented Mar. 19, 1918.

Witnesses

Inventor
M. A. Rohmer

UNITED STATES PATENT OFFICE.

MARTIN A. ROHMER, OF FLORENCE, NEBRASKA.

NUT-LOCK.

1,259,558.  Specification of Letters Patent.  Patented Mar. 19, 1918.

Application filed September 25, 1915. Serial No. 52,696.

*To all whom it may concern:*

Be it known that I, MARTIN A. ROHMER, a citizen of the United States, residing at Florence, in the county of Douglas and State of Nebraska, have invented certain new and useful Improvements in Nut-Locks; and I do hereby declare the following to be a full, clear, and exact description of the invention, such as will enable others skilled in the art to which it appertains to make and use the same.

This invention has for its object to provide a simple and efficient nut lock embodying substantially a locking screw fitted within an internally screw threaded hole formed obliquely through the nut and communicating with the bore thereof, whereby when the screw is advanced, the inner extremity thereof engages and distorts the adjacent threads of the bolt.

Another object is to so arrange the screw receiving opening in the nut as to weaken one corner thereof so as to permit the portion of the nut overlying the screw to be bent inwardly or upset, so as to reliably secure said screw against removal.

With these and other objects in view, the invention consists in the novel construction, arrangement and formation of parts as will be hereinafter specifically described, claimed and illustrated in the accompanying drawing, in which:—

Figure 1:
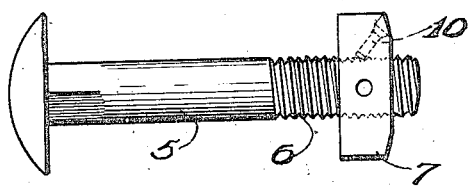
Figure 1 represents a side elevation of the improved nut lock.

Referring to the drawings in detail, wherein similar reference numerals designate corresponding parts throughout the several views, the numeral 5 indicates the shank of a bolt of the usual or any preferred construction, having external screw threads 6 extending inwardly from one end thereof. The preferred type of nut 7 is threaded upon the bolt 5 and is formed with the usual internally screw threaded bore 8.

An aperture 9 is formed obliquely through the nut 7 and is internally screw threaded for the reception of a locking screw 10. The internal threads of the aperture 9 are preferably formed oppositely to the thread of the bore 8 of the nut. The opening 9 communicates with the bore 8 at a point adjacent the longitudinal center thereof, and terminates upon the outer face 11 of the nut at a point intermediate one corner of the latter and the bore. The outer extremity of the opening 9 is enlarged, as at 12, for the reception of the head 13 of the screw 10, which is preferably provided with a slot 14 adapted to receive the blade of a screw driver or other suitable tool, whereby the screw may be conveniently adjusted.

The nut 7 is formed with a second internally screw threaded aperture 15 disposed at right angles to the longitudinal center of the nut and adapted to receive a locking screw.

Figure 2:
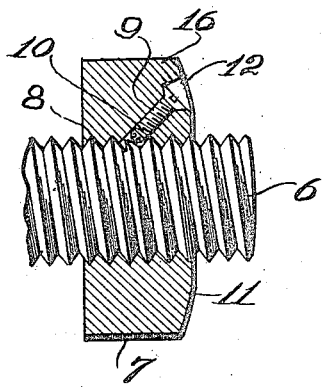
Fig. 2 represents a diagonal sectional view through the nut applied to a bolt.
Figure 3:
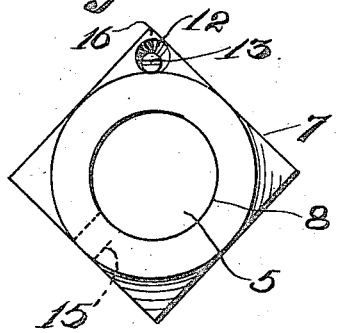
Fig. 3 represents an end elevation of the nut lock.
Figure 4:
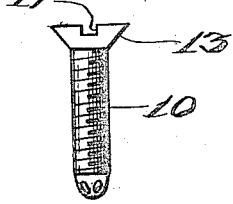
Fig. 4 represents a side elevation of the locking screw removed.

In use, the nut 7 is advanced to the desired position upon the bolt 5, and the screw 10 is subsequently rotated by a screw driver or other suitable tool until the inner rounded extremity thereof forcibly engages and upsets or distorts the threads 6 of the bolt which are disposed within the inner extremity of the opening 9. As clearly illustrated in Fig. 2, the screw 10 is of such length that when advanced to locked position, the head 13 thereof is disposed entirely within the outer face 11 of the nut. The lip 16 formed by the enlarged outer end 12 of the opening 9 is adapted, subsequent to the adjustment of the screw, to be upset or bent inwardly by a blow delivered thereon by a hammer or other tool, so as to engage the upper surface of the screw head 13 and thus reliably and permanently secure the screw against removal.

What I claim is:—

In combination, a bolt, a nut fitted upon said bolt having an oblique internally screw threaded opening intersecting the bore thereof and exposing a portion of the screw threads of the bolt, said opening terminating at its inner end at a point intermediate the ends of the bore and the outer extremity thereof being enlarged and terminating at the outer face of the nut and adjacent the corner between two of the side faces to provide a substantially triangular overhanging lip, a locking screw fitted in said opening having a rounded inner terminal adapted to engage and upset the exposed section of the screw threads of the bolt, and a flat head at the outer terminal of said screw seated against the internal shoulder defined by the enlarged portion of said opening and adapted, when said lip is bent inwardly or upset, to be locked against removal thereby.

In testimony whereof I affix my signature in presence of two witnesses.

MARTIN A. ROHMER.

Witnesses:
H. T. BRISBIN,
J. B. BRISBIN.